United States Patent [19]

Dislich et al.

[11] 4,229,491
[45] Oct. 21, 1980

[54] PROCESS FOR PRODUCING CADMIUM STANNATE LAYERS

[75] Inventors: Helmut Dislich, Budenheim; Paul Hinz; Günther Wolf, both of Mainz, all of Fed. Rep. of Germany

[73] Assignee: JENAer Glaswerk Schott & Gen., Mainz, Fed. Rep. of Germany

[21] Appl. No.: 969,077

[22] Filed: Dec. 13, 1978

[30] Foreign Application Priority Data

Dec. 13, 1977 [DE] Fed. Rep. of Germany ....... 2755468

[51] Int. Cl.$^2$ .................... B05D 1/18; B05D 3/02; B05D 3/04
[52] U.S. Cl. ................................ 427/160; 427/108; 427/164; 427/169; 427/226
[58] Field of Search ............... 427/108, 164, 169, 126, 427/160, 226

[56] References Cited

U.S. PATENT DOCUMENTS

| | | | |
|---|---|---|---|
| 3,811,953 | 5/1974 | Nozik | 204/192 P X |
| 4,048,372 | 9/1977 | Ando et al. | 427/248 X |

*Primary Examiner*—James R. Hoffman
*Attorney, Agent, or Firm*—Haight, Rosfeld, Noble & Santa Maria

[57] ABSTRACT

A dipping process for the production of cadmium stannate layers on a substrate, preferably glass, which comprises:
  (a) dipping said substrate into an alcoholic solution of a reaction product containing cadmium and tin, said solution consisting essentially of compounds having hydrolyzable and pyrolyzable residues;
  (b) withdrawing the substrate from said solution in a humid atmosphere; and
  (c) gradually heating the coated substrate to 650° C., whereby hydrolysis and pyrolysis removes said residues from the coated substrate to form a coated substrate in which the molar ratio Cd:Sn corresponds to that of said alcoholic dipping solution.

9 Claims, No Drawings

PROCESS FOR PRODUCING CADMIUM STANNATE LAYERS

BACKGROUND OF THE INVENTION

This invention relates to a process for producing cadmium stannate layers in which cadmium stannate layers are applied onto a glass substrate by a dipping process, as well as to suitable solutions for implementing the dipping process.

Cadmium stannate layers on glass surfaces are known and characterised by a high electrical conductivity, high infra-red reflecting properties and a low adsorption within the visible spectrum. The application areas offered to the technician can be clearly determined from this, and only a few of them are illustrated here, e.g. heated windows, windows for buildings, doors for microwave ovens, solar collector panels, limiting surfaces for fluid crystal display, etc.

Cadmium stannate layers have been produced to date in a satisfactory quality by means of high frequency atomizing. The process is slow in making up layer thickness and expensive from a capital investment viewpoint. The coating of large area constructions such as window panes is hardly economically rational, since the homogeneous covering of large surfaces requires an enormous expenditure in capital equipment.

The spray process has been described in principle as a second possibility. An aqueous solution of cadmium and tin salts, to which other salts are added in the form of process additives, is sprayed upon hot glass (viz. 600°–700° C.). Depending on the temperature, there is formation of $CdSnO_3$ or $Cd_2SnO_4$, as well as CdO and $SnO_2$, through not as a uniform layer corresponding to the chemical composition of the solution. This is clearly outlined, inter alia, in DT-OS No. 26 54 094 where, according to claims 2 and 3, a molecular ratio of Cd:Sn=3:1 to 40:1, preferably 20:1 is indicated for the solution when seeking a ratio of Cd:Sn of 1:1 or 1:2 in the layer.

Circumstances are even more complex on transition to a multi-component system, for instance when additives are added to the Cd and Sn salt. This is also applicable in the case of high frequency atomizing, as described in AD-A-008-783 NTJS. Quite frequently, an additive for increasing the electrical conductivity, such as indium, does not integrate in the cadmium stannate lattice (at least not in the same quantity as added) and thus remains with little or no effect. The atomizing process furthermore involves a high loss of expensive spray solution, which is not transformed into the covering layer. The environmental pollution arising from toxic cadmium, and its eventual expensive removal, conceals a number of other extremely thorny problems.

Success of the layer formation depends to a considerable extent upon the temperature employed in the atomizing process. In the atomizing of individual heated windows, the edges and the center having differing temperatures during the course of layer formation, leading to a lack of uniformity in the layer in the form of differing thicknesses and differing chemical compositions within the layer. This is particularly evident when the layer thickness approaches an area subject to obvious interferences, which is most common for such layers. When layer atomizing on a moving glass strip, conditions are somewhat improved in relation to individual windows, though the consequences already outlined still remain serious. In addition, even the best nozzle optimization will not ensure a fully uniform coverage with minimal droplets of the closest droplet size distribution and the smallest distribution of kinetic energy in the droplets.

Recourse to ultrasonic atomisation of the spray medium requires the use of a carrier gas to transport the mist to the glass surface, which is the case of internal coating to a tube (which is the most favourable geometry) admittedly results in a much improved homogeneity, though not in the case of large areas of glass, e.g. measuring several square meters. Furthermore, the growth rate of the layer falls off, since the coating material must be continuously transported towards the cooling substrate and consequently has to be reheated over extended periods.

OBJECTS OF THE INVENTION

Accordingly, it is a general object of the present invention to provide a process in which the disadvantages of the high frequency atomizing procedure and spray atomizing procedure are avoided.

Another object of the present invention is to provide a method for the production of cadmium stannate layers of the required properties, particularly high IR-reflection, high transmission within the visible area, high homogeneity and extreme adhesion to the substrate, by the use of a dipping process.

Upon study of the specification and appended claims, further objects, features and advantages of the present invention will become more fully apparent to those skilled in the art to which this invention pertains.

SUMMARY OF THE INVENTION

Briefly, the above and other objects, features and advantages of the present invention are attained in one aspect thereof by providing a dipping process for the production of cadmium stannate layers on a substrate, preferably glass, which comprises:

(a) dipping said substrate into an alcoholic solution of a reaction product containing cadmium and tin, said solution consisting essentially of compounds having hydrolyzable and pyrolyzable residues;

(b) withdrawing the substrate from said solution in a humid atmosphere; and (c) gradually heating the coated substrate to 650° C., whereby hydrolysis and pyrolysis removes said residues from the coated substrate to form a coated substrate in which the molar ratio Cd:Sn corresponds to that of said alcoholic dipping solution.

DETAILED DESCRIPTION

These objects are achieved according to the present invention by way of a process in which the glass is dipped at room temperature in a solution, then withdrawn steadily and heated to a high temperature to form a transparent cadmium stannate layer. According to the present invention, this ensures a process for the production of a fully homogeneous cadmium stannate layer, overcoming all of the aforementioned disadvantages of the two processes according to the present state of the art and allowing economical coating of glass panes as well as tubes of any given geometry.

It has heretofore not been possible to produce cadmium stannate layers of the required properties, particularly high IR-reflection, high transmission within the visible area, high homogeneity and extreme adhesion to the substrate, by the use of a dipping process.

SnO$_2$ layers obtained by dipping are admittedly known, e.g. from DE-OS No. 1,596,813, whereby a glass pane is dipped in a water-free SnCl$_2$ solution, then withdrawn and heated in a humid atmosphere. However, this process only produces layers of limited conductivity (electrical resistance 10,000 to 100,000 Ohms per square) and low IR-reflection, which are quite unsatisfactory for the objectives set out here.

As a result of the process according to the invention, the following advantages are obtained simultaneously and in a continuous operational sequence:

1. Simple production of coatable solutions;
2. Specially adjustable layer composition built into the solution;
3. Specific integration of additives, also built into the solution;
4. Simultaneous two-sided coating of a glass pane at a speed of for instance 1 m or more per minute;
5. Layer burn-on in the atmosphere, i.e. without the need of a protective or reducing gas;
6. Complete utilization of the solution bath, i.e. quantitative transformation of the solution into layers;
7. No environmental pollution, which is particularly important in the case of cadmium; and
8. Accurately adjustable layer thickness, both for a batch coating such as of a window pane as well as during continuous production. This feature, as well as those of itmes 2 and 3, allows a high degree of homogeneity, i.e. no irregularities can be discerned with the naked eye, in spite of critical interference layer thicknesses.

The other known advantages of cadmium stannate layers as outlined above are also achieved by the process according to the invention. While not wishing to be bound by any theory of the invention, the invention is presently believed to be based on the concept that the formation of the required cadmium stannate CdSnO$_3$, Cd$_2$SnO$_4$, including further additions to be incorporated as additives in the lattice, should be achieved in advance in the solution, to the extent that the required layer is automatically defined.

In accordance with the present invention, this is achieved by the transformation of a cadmium compound with a tin compound in a required molecular ration Cd:Sn of 1:1 or 2:1 in an alcohol, preferably ethanol, into a soluble complex. The residue R is selected in such a manner that it will hydrolyze off with the formation of metal OH-compounds, the process proceeding slowly at room temperature with atmospheric humidity and more rapidly at high temperature. The metal OH compounds are in turn condensed or polycondensed at higher temperatures into a complex oxide of cadmium stannate. Not all of the residue R need be hydrolyzable, but only a portion thereof, i.e. that part which is used for the layer formation, as described further below. The residue groups may be removable by pyrolitic means. Easily hydrolyzable groups are alcoholate residues such as —OC$_2$H$_5$, —OC$_3$H$_7$ and —OC$_4$H$_9$ as well as chlorides and nitrates. The pyrolyzable residues are generally lower carboxylic acid residues, for instance formate, acetate, propionate, etc. The compounds do not need to be isolated, but can remain in solution.

A preferred combination, to which the invention is in no way restricted, is outlined below to illustrate the case: cadmium acetate with tin tetra-n-butylate is transformed in an alcohol solution, in the following manner:

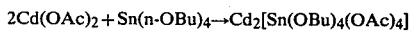

or

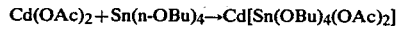

The precise composition of the compound is not known, nor is it of importance for purposes of the present invention; the important point is simply that the reaction of the ingredients leads to a soluble product which contains the residues indicated.

The substrate to be coated, for instance a window pane, is dipped into such a solution and withdrawn at a constant speed in a chamber containing atmospheric humidity. The coating leaves a film from which the solvent alcohol is vaporized, and in which direct hydrolysis of the hydrolyzable groups in accordance with the invention commences in accordance with the following:

Cd$_2$[Sn(OBu)$_4$(OAc)$_4$]+4H$_2$O→Cd$_2$[Sn(OH)$_4$(OAc)$_4$].

At room temperature and during preheating to 150° C. condensation occurs with water separation from the OH-groups and eventually also with separation of acetic acid from —OH and —OAc or of butanol from —OH and —OBu. Which of these reactions predominates is of no observable effect upon the end result.

The coated glass panes pass through an oven, in which they are exposed within 5 to 15 minutes to higher temperatures up to 640° C. during the end-phase, at which point pyrolytic decomposition occurs in addition to further hydrolytic decomposition.

A pure oxide of cadmium stannate is then obtained, in this case as crystallizing, transparent, electrically conductive Cd$_2$(SnO$_4$), which in each case represents the end product of the hydrolysis, polycondensation and associated pyrolysis of the acetate residue.

The CdSn$_3$ with its differing properties described in the examples corresponds precisely to the molar ratios of the solution selected with a ratio of Cd:Sn=1:1.

The incorporation of additives, e.g. In, is also completely correlatable and predeterminable, as in:

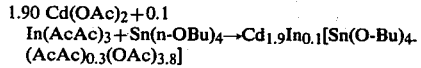

and correspondingly proceeding to Cd$_{1.9}$In$_{0.1}$SnO$_4$ or in any other required ratio or with any other additives of choice, e.g. aluminium:

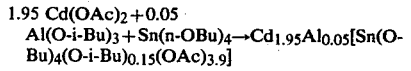

and correspondingly to Cd$_{1.95}$Al$_{0.05}$SnO$_4$.

With these additions, the electrical conductivity, the IR-reflection and the transmission in the visible range can be influenced as desired in a known manner and procedure. As a further definite parameter in the adjustment of the process, the layer thickness produced by the drawing speed, the solution concentration and its viscosity can also be exploited.

The layers thus obtained are completely homogeneous and have thicknesses in the regions of 0.1–0.7 micrometers, electrical resistances of 5–10$^3$ ohms per square or more, IR-reflections up to 89%, transmissions of 80–85% and minimal absorptions in the visible area down to 3%. The layers are strongly adhering and insoluble, brass- and steel- stylus resistant and weatherproof.

The layers are used for heat-insulating glazing which allows the sunlight to penetrate, but prevents heat radiation from escaping, or equally as solar collector panels in which the extremely low sunlight absorption and the high reflection of heat radiation is particularly important.

In the case of warming or heating slabs for electrical heating, the layers are particularly suited, since their resistance over large areas is particularly uniform and barely fluctuates even at temperatures exceeding 500° C. De-icing glazing for ships or motor vehicles and heated non-misting glazing are particularly suited to this application.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight.

EXAMPLE 1

893 g of ethanol tin-(IV)-butylate solution (14% by weight based on Sn) are added to 2822.9 g of methanol cadmium acetate solution (8.37% by weight based on Cd). The Cd:Sn molar ration is 2:1. The clear solution is then added to 37.1 g of acetyl acetone.

A borosilicate glass pane measuring 20×30 cm is dipped in the solution at room temperature and withdrawn at a uniform speed of 1.2 m/min. A clear layer from which the solution reagent evaporates is formed upon the glass. The glass is then treated for 5 minutes at 150° C. in a furnance, then subjected to burn-on for 15 minutes at 640° C.

A clear, strong and homogeneous light-yellow colored layer resisting any steel-stylus scratching is formed. It has an electrical resistance of 35 ohms per square and an IR-reflection of 70% at 10 micrometers.

EXAMPLE 2

A similar procedure as for Example 1 is adopted, though using quartz-glass as the carrier and heating for 15 minutes at 645° C. The electrical resistance is 35 ohms per square, the IR-reflection being 70% at 10 micrometers.

EXAMPLE 3

A similar procedure as for Example 1 is adopted, though using floatglass as the carrier. The electrical resistance is 70 ohms per square.

EXAMPLE 4

893 g of ethanol tin-(IV)-butylate solution (14% by weight based on Sn) is added to 2542.8 g of methanol cadmium acetate solution (4.65% by weight based on Cd). The molecular ratio of Cd:Sn is 1:1. The clear solution is added to 37.1 g of acetyl acetone.

The same procedure as in Example 1 is then adopted, the glass remaining at 150° for predrying, then at only 500° C. for 15 minutes for burning on. This forms a clear, strong and homogeneous steel-stylus resistant layer, with a resistance of 250 ohms per square.

EXAMPLE 5

800 g ethanol tin-(IV)-butylate solution (14% by weight based on Sn) are added to 622.4 g methanol Indium-(III)-acetyl acetonate solution (2.79% by weight based on In) then to 1930 g of a methanol cadmium acetate solution (10% by weight based on Cd). The molecular ratio of Cd:In:Sn is 1.84:0.16:1. A further 33.28 g of acetyl acetone is added to the solution.

The same procedure as for Example 1 is then adopted. When burning on at 640° C. a clear, strong and homogeneous light yellow steel-stylus resisting layer is formed, having an electrical resistance of 30 ohms per square and an IR-reflection of 75%.

EXAMPLE 6

1042 g of ethanol tin-(IV)-butylate solution (14% by weight based on Sn) are added to 3,294 g of methanol cadmium acetate solution (8.37% by weight based on Cd), then added to 17.76 g of aluminum sec-butylate. The molecular ration of Cd:Al:Sn is 1.95:0.05:1. The clear solution is added to 43.3 g acetyl acetone.

The same procedure as in Example 1 is then adopted. On burning on at 640° C. a clear, strong and homogeneous light yellow layer is formed, having an electrical resistance of 30 ohms per square and an IR-reflection of 74% at 10 micrometers.

The preceding examples can be repeated with similar success by substituting the generically or specifically described reactants and/or operating conditions of this invention for these specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. In a dipping process for the production of cadmium stannate layers on a substrate, the improvement which comprises:
    (a) dipping said substrate into an alcoholic solution of a reaction product containing cadmium and tin derived from a cadmium compound and a tin compound, said solution consisting essentially of compounds having hydrolyzable and pyrolyzable residues;
    (b) withdrawing the substrate from said solution in an atmosphere sufficiently humid for the subsequent hydrolysis; and
    (c) gradually heating the coated substrate to 650° C., whereby hydrolysis and pyrolysis removes said residues from the coated substrate to form a coated substrate in which the molar ratio Cd:Sn corresponds to that of said alcoholic dipping solution.

2. A process according to claim 1, wherein said hydrolyzable groups are alkanol residues.

3. A process according to claim 2, wherein said alkanol residues are selected from the group consisting of methoxy, ethoxy, propoxy, butoxy and mixtures thereof.

4. A process according to claim 2, wherein the pyrolyzable residues are selected from the group consisting of formate, acetate, propionate or higher carboxylic acid residues.

5. A process according to one of claims 2 to 4, wherein said dipping solution further contains an additive selected from the group consisting of hydrolyzable or pyrolyzable indium, lead, aluminium, titanium or niobium compounds.

6. A process according to claim 5 wherein the molar ratio of Cd:Sn in the layer is 1:1.

7. A process according to claim 5 wherein the molar ratio of Cd:Sn in the layer is 2:1.

8. A process according to one of claims 1 to 4, wherein the molar ratio of Cd:Sn in the layer is 1:1.

9. A process according to one of claims 1 to 4, wherein the molar ratio of Cd:Sn in the layer is 2:1.

* * * * *